(12) United States Patent
Tullis

(10) Patent No.: US 6,535,685 B1
(45) Date of Patent: Mar. 18, 2003

(54) ARCUATE FIBER ROUTING USING STEPPED GROOVES

(76) Inventor: Barclay J. Tullis, 1795 Guinda St., Palo Alto, CA (US) 94303

( * ) Notice: Subject to any disclaimer, the term of this patent is extended or adjusted under 35 U.S.C. 154(b) by 0 days.

(21) Appl. No.: 09/909,957

(22) Filed: Jul. 19, 2001

(51) Int. Cl.[7] .................................................. G02B 6/36
(52) U.S. Cl. ......................... 385/137; 385/134; 385/30
(58) Field of Search ............................ 385/137, 136, 385/134, 30, 49

(56) References Cited

U.S. PATENT DOCUMENTS

| | | | |
|---|---|---|---|
| 5,781,675 A | | 7/1998 | Tseng .......................... 385/30 |
| 5,809,188 A | | 9/1998 | Tseng .......................... 385/37 |
| 6,052,220 A | * | 4/2000 | Lawrence et al. ........ 359/341.1 |
| 6,363,201 B2 | * | 3/2002 | Sherrer et al. ............... 385/137 |
| 6,444,756 B2 | * | 9/2002 | Chan et al. .................. 525/195 |
| 2001/0021301 A1 | * | 9/2001 | Fukuyama et al. ......... 385/137 |
| 2001/0055443 A1 | * | 12/2001 | Zhoa et al. .................... 385/30 |
| 2002/0051618 A1 | * | 5/2002 | TenEyck ...................... 385/137 |

OTHER PUBLICATIONS

Huang Et Al., "MEMS Packaging for MicroMirror Switches" Proc. 48th Electronic Components & Technology Conference, Seattle, WA, May 1998, pp. 592–597.

* cited by examiner

*Primary Examiner*—Lynn Field
*Assistant Examiner*—Michael C. Zarroli

(57) ABSTRACT

Structures and methods using crystalline substrates enable precise and accurate manufacture of side-polished fiber optics. A groove constrains a fiber and includes multiple lengthwise portions with constant widths and depths. Where the depth(s) are small enough, the fiber can be side-polished to create a side-polished region. To either end of a side-polished region, groove depths are made large enough to protect the fiber from side-polishing. The curvature(s) of the fiber away from the side-polished region into deeper portions of the groove are controlled by at least the lengths and depths of the multiple lengthwise portions of the groove. A variety of 2, 3, and 4-port fiber optic apparatuses can be constructed using the disclosed structures.

20 Claims, 8 Drawing Sheets

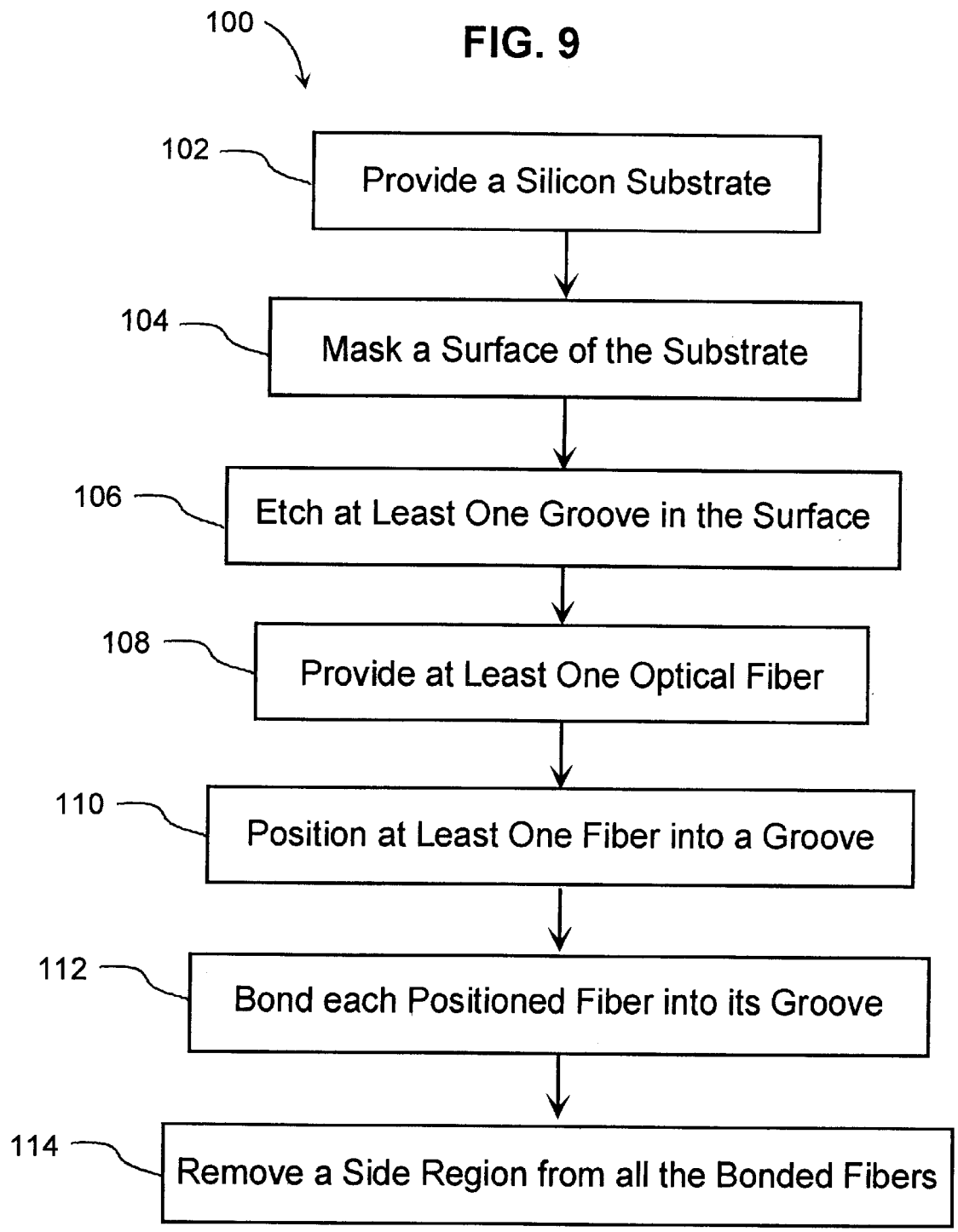

ARCUATE FIBER ROUTING USING STEPPED GROOVES

BACKGROUND OF THE INVENTION

This invention generally pertains to structures and methods exploiting silicon processing technology for accomplishing both arcuate and straight segment shapes of path trajectory for an optical fiber within a groove across a surface of a supporting substrate. It particularly applies when the surface region of side-polish on the fiber is generally co-planar with the silicon surface containing the groove and the arcuate path within the groove lies in a plane that is parallel to the normal to the silicon surface. It applies to single-mode optical fibers as well as optical fibers that are not single-mode.

An objective of this invention is to improve the yield and lower the cost of manufacture for precision side-polished fiber optic components.

There are no prior art methods, structures, apparatuses, or devices published or on the market for utilizing precision silicon processing technology to achieve ultra-precise alignments of interacting side-polished fiber optics as when joining two side-polished fibers face to face against their side-polished areas. What is known in the related prior art deals with implementation of single fibers that are side-polished to implement two-port photonic functions requiring no side-by-side critical alignment to other fibers. This prior art is taught in U.S. Pat. No. 5,809,188 "Tunable optical filter or reflector" and U.S. Pat. No. 5,781,675 "Method for preparing fiber-optic polarizer", both by Tseng.

Tseng's patents teach the use of V-grooves etched in a 100 surface of a silicon crystal substrate and having a continuously varying groove depth. Note that "100" refers to crystal orientation as defined by Miller indices as generally known in the field of crystallography and silicon processing. Tseng's patents teach how such a continuous arcuate groove achieves both a) an arcuate path for guiding the fiber along an arcuate path trajectory and b) precise control of the remaining side-wall thickness left along a controlled length of the arcuate, side-polished fiber that is bound within the groove.

Tseng's patents teach methods to achieve superior precision in groove dimensions and consequent control of remaining, polished, sidewall thickness to a fiber held within a silicon V-groove. Using this technique, the cross-sectional shape of a groove running parallel to the 110 direction is that of a "V-shape", wherein the side-walls of the "V-shape" are 111 planes. This technique works well because the 111 etch direction has a significantly slower etch rate than any other direction. A continuous change in groove depth is used to achieve an arcuate path with a long radius of curvature for holding a fiber and thereby guiding the fiber itself into an arcuate path trajectory.

But a disadvantage exists with attempting to achieve a precise groove depth with Tseng's technique. If the groove was of constant depth (and width), the side-walls would indeed be 111 planes, and since they are the slowest to etch, the cross-section would be precisely determined by width of the etch mask. However, Tseng teaches the use of a smoothly curved groove depth (and width) thereby causing the side-walls to be determined by a very large set of 111 planes intersecting the groove. This makes the groove depth at the shallowest point harder to define by etch-rate and etch-time, since the etchant can attack the groove-forming substrate from directions other than just the 111 direction.

Another shortcoming of the above cited Tseng inventions is that the length of the side-polished area is strongly a function of the radius of curvature of the arcuate path of the fiber. In order to achieve a shorter length to a side-polish on a fiber, it then becomes necessary to use a shorter radius of curvature. The current invention overcomes this disadvantage by utilizing a straight middle portion of path trajectory. At the ends of the straight portion, the current invention uses either short-radius, arcuate, portions of path length, or portions of groove that are deeper in the substrate. This can make the side-polish length more a function of the length of the straight portion and less a function of the particular fiber-path radius or radii used within the end portions. This also allows two such fibers to be joined face-to-face against their side-polished areas to create optical couplers wherein the interaction length of coupling can be selected or adjusted. With the current invention, this adjustment can be accomplished more precisely either by design specification of the length of the straight middle portion of the groove or by shifting one fiber relative to the other along the direction parallel to the groove axes. This is because the arcuate end portions can be made relatively short compared to a path determined by a single radius of curvature.

No prior art teaches methods, structures, apparatuses, or devices for achieving an arcuate fiber trajectory by using a few steps in mask pattern width or by few incremental steps between portions of the groove wherein each portion has a constant depth. And no prior art teaches use of either arcuate or stepped grooves to achieve an arcuate fiber trajectory having a long straight portion in the middle. And no prior art teaches use of a groove that has a midportion that is of constant width and depth joined with end portions that increase in depth with transitions parallel to crystal planes.

Additional prior art on positioning of fiber optics on substrates is found in the technology of Microelectronic Mechanical Systems (MEMS). One reference to such technology is that of "MEMS Packaging for Micro Mirror Switches", by L. S. Huang, S. S. Lee, E. Motamedi, M. C. Wu, and C. J. Kim, Proc. 48th Electronic Components & Technology Conference, Seattle, Wash., May 1998, pp. 592–597. But this prior art does not teach the use of arcuate groove shapes or arcuate fiber trajectories, since a single V-groove of constant width and depth cannot alone shape an arcuate path for an optical fiber.

Another aspect of using a groove to guide the path shape of a fiber is that continuous contact between a fiber and a groove with either a straight or arcuate trajectory is susceptible to contamination in the form of a particulate or a film. Mechanical interference with such contamination can alter the accuracy and/or precision of the trajectory (i.e. shape) of the fiber. For example, a contaminating particle or film positioned between a surface of the groove and the surface of the fiber it guides can perturb the position of the fiber from precisely following the contour of the groove.

What is needed are structures and methods that can utilize a combination of groove features, using length-wise portions that each have constant width and constant depth to better exploit the dimensional controls achievable with photolithography and etching to guide an optical fiber along a straight or arcuate trajectory. The current invention provides these structures and methods, provides better determination of interaction length for couplers (and other 4-port fiber optic components) and reduces susceptibility to fiber misalignment caused by particulate or film contamination on either the groove surface(s) or on the surface of the fiber.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the methods and structures (or apparatuses or devices) and combinations particularly pointed out in the appended claims.

The objects of the invention are principally five-fold: a) to provide methods and structures to accomplish a precise and accurate fiber trajectory or path within a groove in the surface of a crystal substrate for creating a side-polished optical fiber wherein a portion of the fiber path is straight, b) to cause the length of side-wall polish for an optical fiber in such a groove to be a strong function of the length of the straight portion and less dependent on the length(s) or radius (or radii) of arcuate portions, c) to accomplish more precise and accurate control of side-wall thickness in the cladding of an optical fiber, d) to provide for lengthening or shortening a polished side-wall while simultaneously reducing the length(s) of arcuate portion(s), and e) to reduce the probability of a contaminating particle or film from perturbing the trajectory of a fiber.

Within this specification, and applied to this invention, the word "structures" is used to include "apparatuses" or "devices". Also, "trajectory" is used to refer to a fiber or groove path extending over the length of a groove.

These and other objects of the invention are provided by a novel use of stepped V-grooves in a crystalline substrate. A central portion (or one or both end portions) of the fiber length along the groove can be straight. One or both ends of a first fiber, and of a groove containing the fiber, can curve farther into the substrate to provide mechanical clearance for the end portions of the fiber to be protected from a side polishing tool at the surface of the substrate. This also provides later for clearance from unpolished portions of a mating side-polished second fiber.

The curvature required of side-polished fibers is slight (radii of curvature designed anywhere from approximately 10 cm to 2000 cm). Therefore, a fiber can be physically routed by a groove structure composed of a sequence of generally contiguous segments each specified to be of a constant depth (and width if the cross-section is to be V-shaped). Moving away from the portion of the groove that has the smallest depth, the depths of the other groove segments can increase gradually. As an optical fiber is reasonably stiff and cannot be bent around sharp corners, the trajectory a fiber takes when placed within such a segmented and stepped groove is determined by contact points along the length of the shallowest portion and the outer end portions of each successively deeper adjacent segment.

Between adjacent segments, the fiber can be free-floating, unless or until such time as it is connected to the groove side-walls via a thickness of bonding material. There are two advantages of having portions of the fiber be free-floating at least during the initial assembly of the fiber into the groove. One advantage is that there is less of the fiber length susceptible to position displacements which could otherwise be caused by contamination particles or films coming between the fiber and a groove surface. The second advantage is that, should the fiber need to be removed from the substrate and groove, it is easier to etch, dissolve, or otherwise remove a bonding material from between the fiber and the groove if there is a larger access path to the fiber surface portions that face the groove surfaces.

The preferred implementation of this invention utilizes a groove geometry comprised almost entirely of 111 crystal planes. This preferred implementation uses a sequence of adjacent length portions each having constant width and depth but stepping between magnitudes from portion to portion. Even the short transition between any two of these adjacent portions can be comprised of a 111 crystal plane surface. With a significant length to the shallowest portion of the groove, the remaining side-wall thickness on the clad of an optical fiber after polishing the fiber down to the surface of the substrate, can therefore be very precisely and accurately controlled.

The reader will readily appreciate the novel use of a segmented groove geometry to better exploit the etch-stop properties of 111 crystal planes in determining a groove geometry for precise and accurate control of remaining side-wall thickness in the cladding of an optical fiber side-polished within a crystalline substrate of silicon or even other III–V materials.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1A shows the unpolished fiber along with a substrate having a groove in one of its surfaces, the varying groove depth helping to establish an arcuate path for placement of the fiber. FIG. 1B shows the fiber positioned in the groove and that a portion of the fiber lies above said surface. FIG. 1C shows the fiber in the groove after removal of that portion of the fiber that was protruding above the surface of the substrate.

FIG. 2A shows the fiber and groove that place the core wholly within the groove, leaving a portion of fiber cladding above the surface, at this cross-section. FIG. 2B shows a similar view to that of FIG. 2A except that the aforementioned portion of the cladding that lies outside of the groove has been removed. What is meant by "portion of the cladding that lies outside of the groove" is the portion of cladding that lies to one side of the plane of the surface containing the groove and to that side which is opposite from the bulk of the substrate.

FIG. 4 shows a stepped groove wherein the groove is defined along its length by a sequence of constant sub-portions each of which has a V-groove shaped cross-section of constant width and depth over most of its length, and wherein the transitions between these sub-portions are themselves defined by 111 surfaces. For simplicity of illustration, only three constant sub-portions are shown in this figure. Constant sub-portions can be of different length, width, and depth. The 111 planes making up the side-walls of the V-groove sub-portions, each sub-portion of which has a constant width and depth, intersect the substrate surface along lines that are parallel to the length-wise direction of the groove. Optionally, a 111 plane can be made to comprise the transition between any adjacent constant-width and depth sub-portions. And the line of intersection of such a 111 plane with the 100 plane of the substrate surface is perpendicular to the length-wise direction of the groove.

FIG. 5A shows the fiber before it is side-polished, while FIG. 5B shows the fiber after the fiber has been side-polished. Both figures show the fiber directed along a path or trajectory that is comprised of a straight portion in the middle between two arcuate portions where the fiber runs from contact with the middle groove portion to contact with the outer ends of each of the adjacent groove portions.

FIG. 9 shows actions comprising a method, according to the invention, for making a side-polished optical fiber held in a groove within the surface of a silicon substrate.

DETAILED DESCRIPTION OF THE INVENTION

Figure 1A:
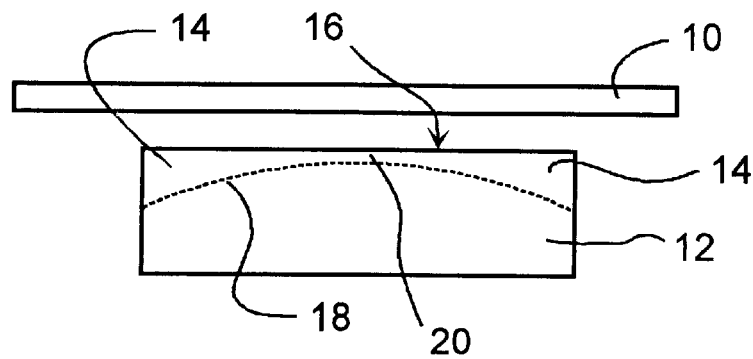
FIGS. 1A, 1B, and 1C show major steps in the creation of a side polished optical fiber according to prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
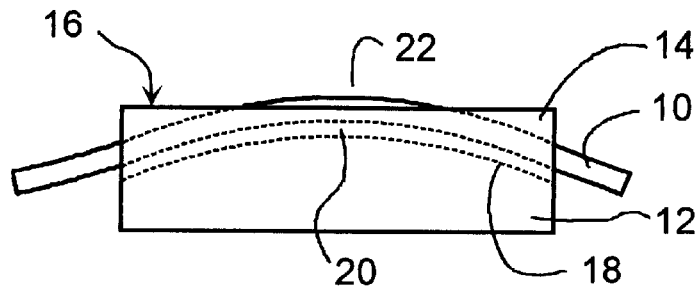
Figure 1C:
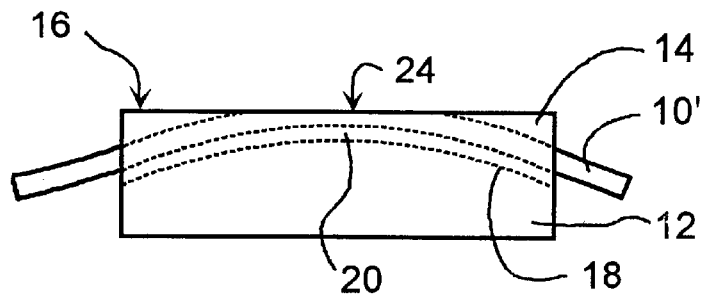

Reference is now made to FIG. 1A, FIG. 1B, and FIG. 1C, that illustrate a prior art for placing and positioning a fiber 10 within an arcuate groove 18, removing a side-wall portion 22 of the fiber 10 protruding above the surface 16, and leaving a surface-polished side-wall region 24, and thus a side-polished fiber 10'. FIG. 1A shows a fiber 10 along with a substrate 12. An arcuate groove 18 is formed in the surface 16 of the substrate 12, with end portions 14 made deeper then the middle portion 20. FIG. 1B shows the fiber 10 laid into the groove 18 leaving a sidewall portion 22 of the fiber 10 protruding above the surface 16. FIG. 1C shows the side-polished surface region 24 being parallel and coincident to the surface 16 of the substrate 12 after the protruding portion 22 (shown in FIG. 1B) has been polished away. What remains is a side-polished fiber 10'. The purpose of this prior art is the creation of a side-polished fiber 10' held firmly in a substrate 12, and wherein the side-polished region 24 lies in the plane of the surface 16. If the fiber 10 is a fiber optic, and the side-wall removed is from the cladding layer of the fiber, light can be evanescently coupled into or out of the fiber core via this side-polished region 24. In the prior art, these arcuate grooves are made mechanically with an abrasive device such as a wire saw, a cutting tool such as a metal blade or diamond bit, or chemically by etching. A principal advantage of the arcuate groove 18 is that the fiber 10 is recessed in the end portions 14 of the groove 18, and below the surface 16, such that tooling used to polish away the protruding side-wall 22 does not damage the remaining portions of the fiber 10'.

Figure 2A:
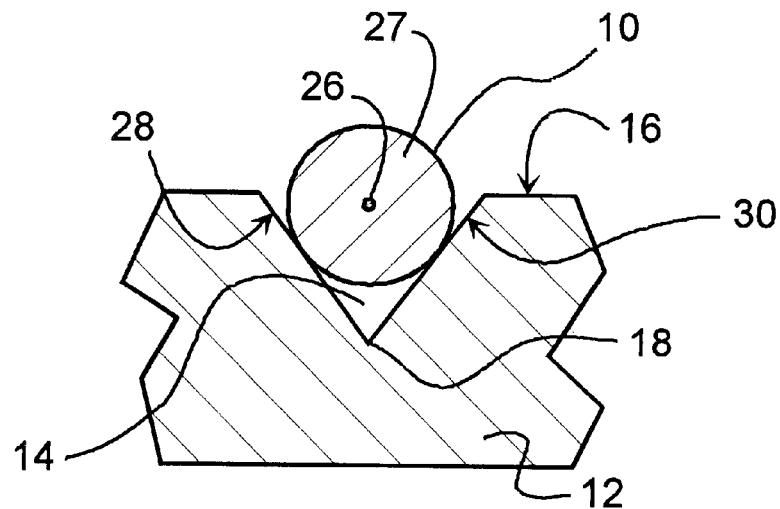
FIGS. 2A and 2B show, according to prior art, cross-sectional views of an optical fiber, having a core and a cladding, positioned in a groove in a surface both before and after polishing of a side-wall of the fiber.
Figure 2B:
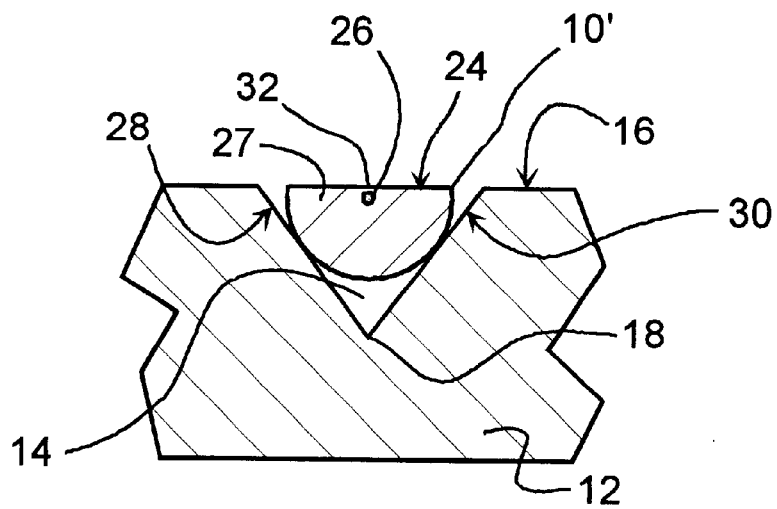

FIGS. 2A and 2B show, according to prior art, cross-sectional views of an optical fiber before 10 and after 10' side-polishing. These cross-sections represent a location along an arcuate groove 18 where the groove is shallowest, such as region 20 in FIG. 1. In FIG. 2A, the fiber 10 is held in a V-shaped groove 18 formed in the surface 16 of a silicon crystal substrate 12. The fiber 10 is of circular cross-section, having a core 26 and a cladding 27. The core 26 of the fiber 10 lies wholly below the surface 16 of the substrate 12. The normal to the surface 16 is parallel to the 100 crystal direction of the silicon, where "100" designates Miller indicies as known to one skilled in the field of crystallography. The surfaces 28 and 30 defining the side-walls of the V-groove 18 are 111 planes of the silicon crystal and form an included angle of approximately 70.53 degrees. The direction of the groove along the surface 16 is perpendicular to the page of the figure, parallel to 110 planes, and is parallel to the lines of intersections (not shown) between the 111 planes of the sidewalls 28 and 30 and the 100 surface 16. The space between the fiber 10 and the groove side-walls 28 and 30, such as region 14, can be used to hold bonding material to hold the fiber 10 into the groove 18.

In FIG. 2A, it can be seen that the width and angle at the bottom of the groove determines a depth of the V-groove 18. This result, along with the fiber diameter, determines the position of the axial center of the fiber 10. The position of the fiber 10 is thereby precisely determined by simple geometric relationship relative to the groove 18, and consequently to the surface 16 and therefore the substrate 12. It is important to note that the flatness of 111 crystal faces defining the V-groove facilitate accurate placement of a fiber. It is equally important to note that the flatness of the 100 crystal plane defining the top surface 12 aids in aligning the fiber with other objects and features also located relative to this surface 16. But it is most important to note for the creation of side-polished fiber optics, using lithographic techniques and anisotropic wet-etching of the crystal substrate, that given the diameter of the fiber and the geometric properties of the crystal, it is ultimately the width of the groove 18 at the surface 16 that determines the location of the center of the fiber relative to the surface 16. Note in this FIG. 2A, that the core 26 shown at the center of the fiber 10 is shown located by design to be entirely below the surface 16.

FIG. 2B shows a similar view to that of FIG. 2A except that the portion of the cladding 27 that lies outside of the groove 18 has been removed. What is meant by "portion of the cladding that lies outside of the groove" is the portion of cladding that lies to one side of the plane of the surface 16 containing the groove 18 and to that side which is opposite from the bulk of the substrate 12. The removal process of the portion of cladding is generally one of mechanically polishing the cladding portion above the surface 16 until the polishing tool first reaches the surface 16 of the substrate. This removal by polishing leaves an optically polished surface 24 on the cladding 27 of the now modified fiber 10'. Note that the surface 24 of the polished cladding is now coincident with the surface 16 of the substrate 12, leaving a thin sidewall 32 of cladding material remaining between the core 26 and the surface 24. It is this thin sidewall 32 that permits light transmitted by the core 26 of the fiber 10' to evanescently couple through the surface 24. Thus it is that ultimately the width of the groove 18 at the surface 16 determines the thickness of cladding between the plane of the surface 16 and the core 26 of the fiber 10'. This is the prior art of Tseng used to precisely determine a region of side-polish on a fiber held in a groove having an arcuate path with V-shaped cross-sections in a silicon substrate.

Figure 3:
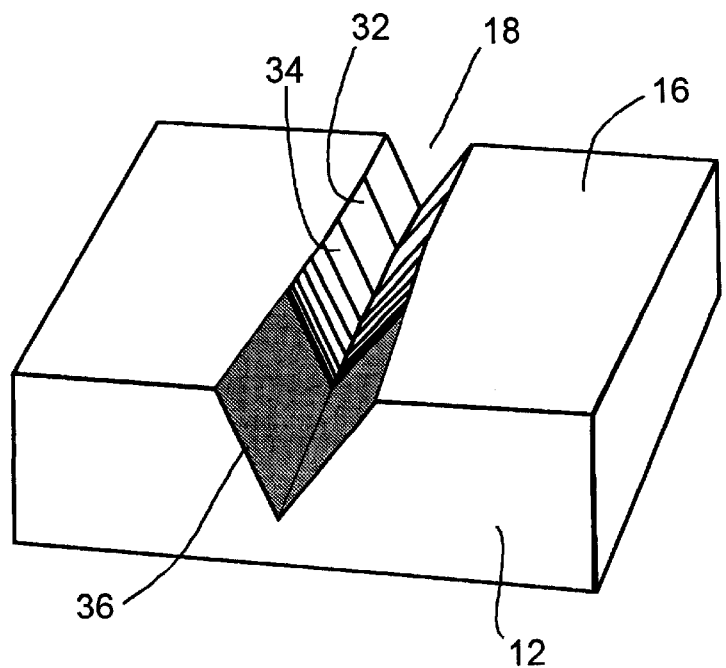
FIG. 3 shows, according to prior art, a portion of an arcuate groove that is formed in the 100 surface of a silicon crystal substrate having crystal alignment properties wherein the V-groove cross-sections are defined by the 111 planes of crystal orientation. This figure also shows that the number of 111 crystal planes defining the groove walls increases as the rate of groove depth increases. This figure also shows that toward where the tangent to the groove bottom approaches parallelism with the substrate surface, the distance along the groove between changes in 111 crystal planes increases.

FIG. 3 shows, also according to prior art, a portion of an arcuate groove 18 that is formed, as in FIG. 2A and FIG. 2B, in the 100 surface of a silicon crystal substrate 12 having crystal alignment properties wherein the V-groove cross-sections are defined by 111 planes of crystal orientation, examples of which are the 111 surfaces shown as 32 and 34. Each of these 111 surfaces 32 and 34 have an exposed length, in the direction of the groove length, and a generally perpendicular edge. The groove 18 illustrated has a shallowest depth at one end of the substrate 12 (the end nearest the background of this perspective view) and gets deeper at an accelerating rate toward the foreground of the view. FIG. 3 shows that the number of 111 surfaces defining the groove walls increases as the rate of groove depth increases, while the lengths of the exposed areas decrease. Where the depth of the groove 18 increases very rapidly, the number of 111 planes are too numerous and their exposed lengths too short to illustrate except to represent the combination of their many edges as a shaded region 36. A principal disadvantage of anistropically etching silicon to create such a groove is that the etch rate normal to 111 surfaces is significantly slower than any other direction. Where edges of 111 planes are exposed, the etch rate is rapid, thus making it more difficult to control the shape of the groove than were it defined with only 111 planes and no edges.

Figure 4:
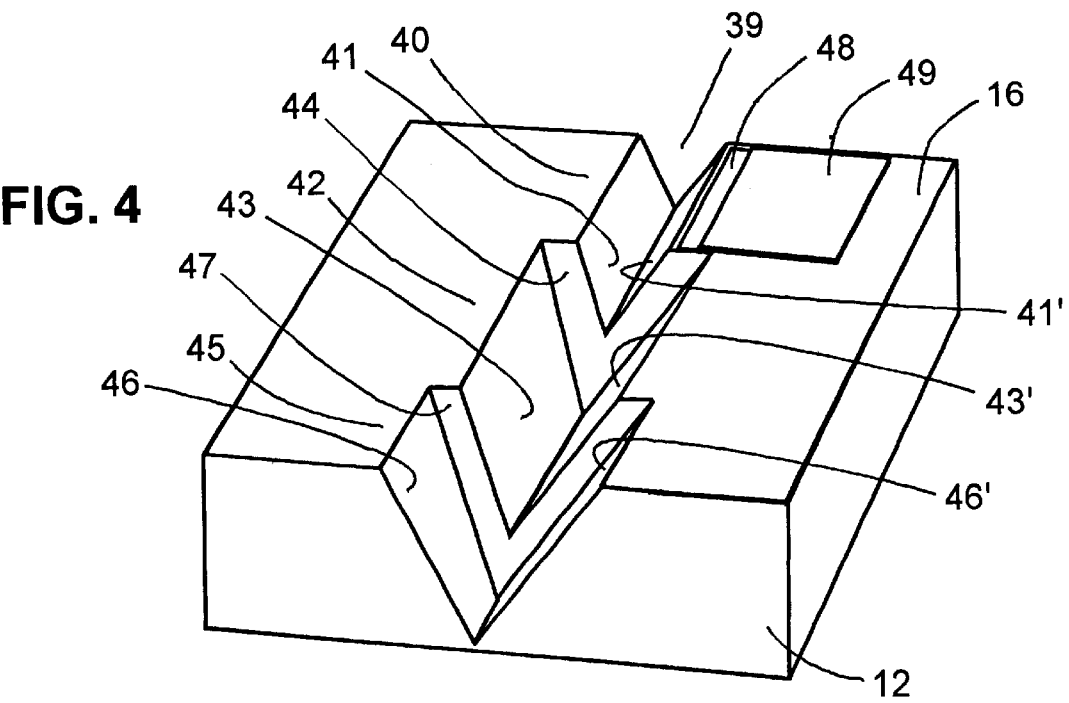
FIG. 4 shows novel improvements over the prior art for structure of a substrate with which to define an arcuate path for holding a fiber optic.

FIG. 4 shows novel improvements over the prior art for creating a groove to hold a fiber in an arcuate path trajectory. The current invention results from realizing that a fiber does not have to lie at the bottom of a groove along the entirety of its arcuate trajectory, nor does it have to be supported as completely or as precisely once the fiber is deep enough to lie below the surface of the substrate.

FIG. 4 shows a groove 39 that is comprised generally of a small number of 111 surfaces, such as those shown as 41, 41', 43, 43', 44, 46, 46', and 47. The groove 39 as illustrated is made up of five portions of groove along its length. Three portions (i.e. a first portion 40, a second portion 42, and a third portion 45) are constant portions, each having a constant cross-section, i.e. a constant width and constant depth. The sidewalls of these three portions consist of 111 surfaces such as 41, 43, and 46 on one side of the groove and 41', 43', and 46' on the opposite side of the groove. The width and depth of the constant portions in this illustration increase from the first portion to the second portion, and from the second portion to the third portion. The 111 surfaces 44 and 45 are transition surfaces comprising transition regions that interconnect otherwise adjacent constant portions. The normals to these transition surfaces lie in a plane parallel to both the lengthwise direction of the groove 39 and the normal to the substrate surface 16. This figure (FIG. 4) illustrates how a groove 39 having at least two length portions (40 and 42) of constant cross-section and one intervening transition portion 44 can be extended with one or more additional portions of groove along the length of the groove, in this case one additional transition portion 47 and one additional portion 45 of constant cross-section. The various portions of constant cross-section can be of different lengths. And steps in both width and depth from one constant portion to the next (within transition portions) can have different magnitudes and can either increase or decrease. One skilled in the art of etching can appreciate the advantage photolithography (or E-beam patterning) and etching have for precisely and accurately constructing such a groove structure compared to mechanical means.

Constraining the surfaces of a groove to be defined along crystal planes having the slowest etch rate is a technique that can be exploited in any cubic crystal such as silicon or Gallium Arsenide (GaAs) to achieve accurate and precise location of a fiber within such a groove. Not only does this technique provide precision in locating a fiber optic core relative to a polished side-wall of cladding, but it also provides for precisely aligning a fiber relative to other features located on the same substrate. In FIG. 4 for example, an electrode film 48 is shown along with feature 49 located on the surface 16 or the substrate 12. These other features may include at least one or a combination of such items as a light source, a detector, a grating, a diffractive optic, a non-linear material, a reflector, a grin lens, a spherical lens, a refractive prism, a polarizer, a filter, an isolator, a circulator, a modulator, an attenuator, a coupler, a multiplexer, a switch, a planar optical circuit, and an integrated circuit.

Other crystalline materials can also be exploited for the precision of their crystalline surfaces such as, but not limited to, quartz, lithium-niobate (LiNbO3), potassium dihydrogen phosphate (KDP), lithium tantalate ($LiTaO_3$), barium titanate ($BaTiO_3$), silicon germanium (SiGe), indium phosphide (InP), gallium indium arsinide (GaInAs), and crystals of III–V compounds in general, or even some organic crystals.

Figure 5A:
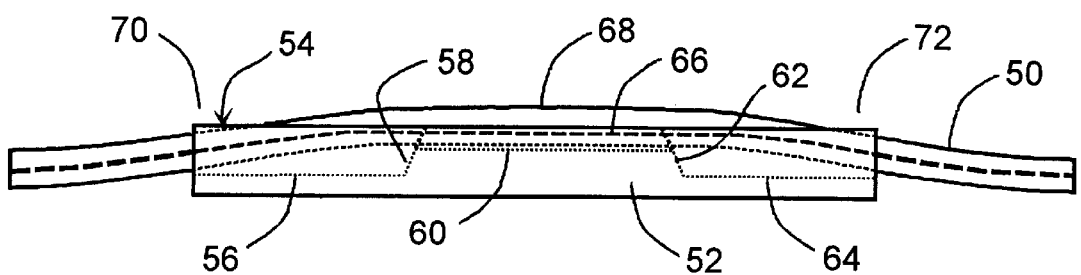
FIGS. 5A and 5B show a fiber before and after side-polishing, wherein the fiber lies along a path defined by a groove in a surface of a substrate, and wherein the groove length is comprised of groove portions having constant cross-sectional dimensions, each pair of these constant portions that are adjacent to one another being joined by a transition portion.
Figure 5B:
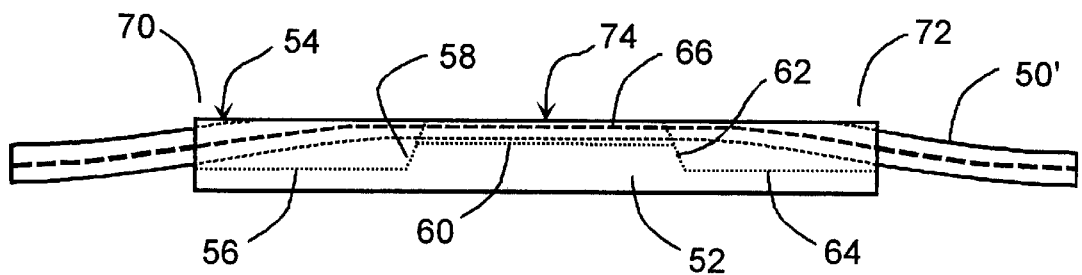

FIG. 5 has two parts, FIG. 5A and FIG. 5B, which respectively show a fiber before 50 and after 50' side-polishing. The apparatus shown in FIG. 5B is what is known as a two-port half-coupler. The fiber 50&50' lies along a path defined by a groove in a surface 54 of a substrate 52. Said groove is comprised of lengthwise portions 56, 58, 60, 62, and 64. The portions 56, 60, and 64 have constant cross-sectional dimensions, although the cross-sectional dimensions of the middle portion 60 are smaller than the crosssectional dimensions of the end portions 56 and 64. The portions 58 and 62 are transition portions joining the adjacent portions of constant cross-section. Portion 58 is the transition between portion 56 and 60; portion 62 is the transition between portion 60 and 64. Both FIG. 5A and FIG. 5B show the fiber 50&50'directed along a path or trajectory in the groove comprised of portions 56, 58, 60, 62, and 64. The fiber 50&50' lies within the middle portion 60 of the groove such that a region of sidewall 69 (of fiber 50 in FIG. 5A) remains protruding above the surface 54 of the substrate 52. In the groove portions 56 and 64, the fiber 50&50'curve toward the bottom of those groove portions 56 and 64 but touch the sides of the V-shaped groove only near the outer ends 70 and 72 of those portions (ends farthest from the middle portion 60). Within the length-wise extent of the groove portions 56 and 64, the fiber 50&50' follow an arcuate trajectory to where they are below the surface 54.

FIG. 5A shows the fiber 50 before it is side-polished, while FIG. 5B shows the fiber 50' after the fiber has been side-polished. The region of sidewall 69 (of fiber 50) shown in FIG. 5A has been removed in FIG. 5B to expose a region 74 of side-polish on the side of the fiber 50', and this region 74 of side-polish lies within the plane of the surface 54 of the substrate 52. Observe in FIG. 5A and FIG. 5B that the core 66 of the fiber 50&50' lies below the surface 54 of the substrate 52. The surfaces 54 and 74 in FIG. 5B may be at least partially coated with at least one film, and this film may be of an electro-optically active material. The surface 54 of the substrate may also include at least one integrated circuit. The integrated circuit may include at least one planar optical waveguide.

A great advantage of the current invention over the prior art of side-polished fibers in silicon substrates is illustrated in FIG. 5B and has to do with what is known in the art as interaction length. Interaction length is that length along a fiber where the side-wall has been removed enough to permit significant evanescent wave coupling across the side-polished surface to or from the fiber core. This advantage is that of being able to implement a longer interaction length within a given length of silicon. It is also that of being able to include a middle region where the interaction parameters, such as remaining side-wall thickness, are held constant. This is to be contrasted with the prior art that is limited to a single arcuate groove, with a constant radius of curvature, to serve as a path for a fiber. In the current invention, a portion 60 of constant groove depth and remaining sidewall thickness is achieved within the region of side-polish. Also with the current invention, the distances over which the thickness of removed sidewall tapers to zero where the fiber first lies below the substrate surface can be made shorter than in the prior art. This is because in the current invention, the radius of curvature in such a transition region can be made significantly smaller than the radius of curvature used in the prior art, without significantly shortening the interaction length. In the prior art of arcuate side-polished fibers in silicon substrates, the radius of curvature of the fiber is between 50 cm and 2000 cm. In the current invention, the radii of curvature of the fiber in the transition regions can be made much smaller than 50 cm.

Figure 6A:
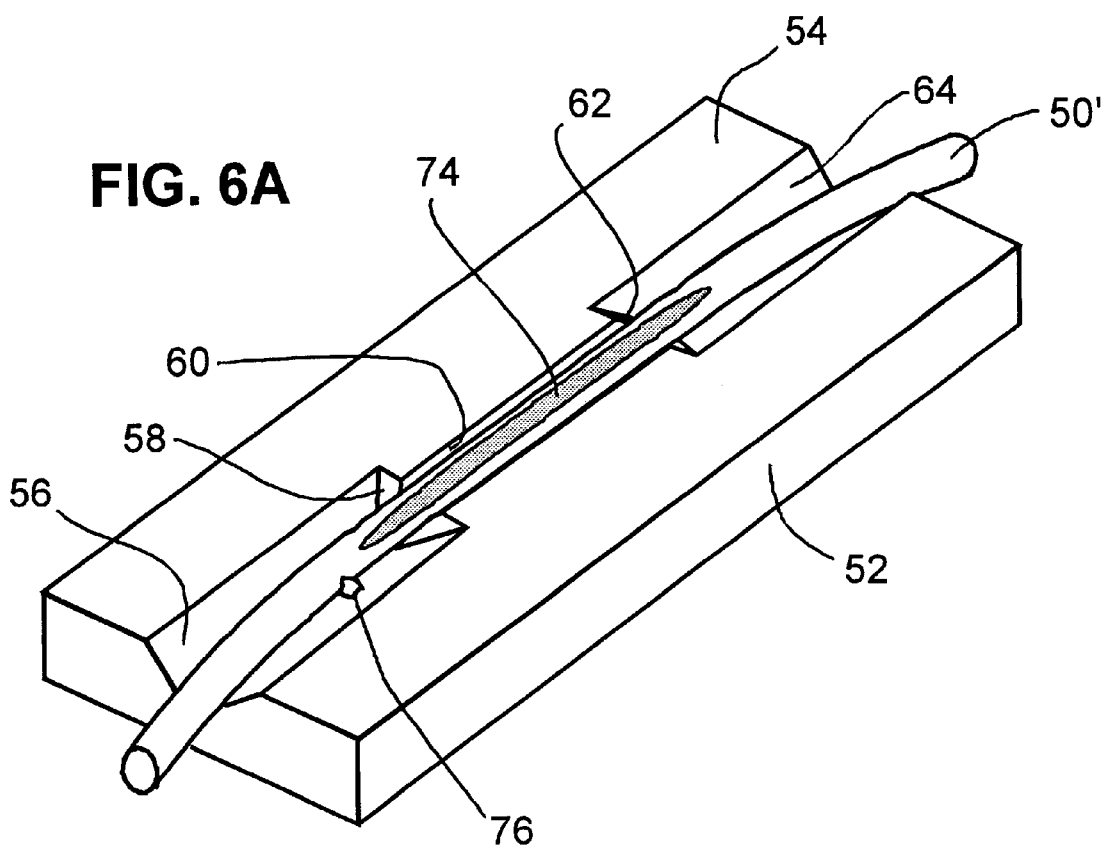
FIGS. 6A and 6B show perspective views of what is shown in FIG. 5B. In this perspective view, the side-polish area of the fiber is shaded and is therefore more completely represented. Note that over the middle portion of the groove, the width and depth of the groove are of constant value and are at their smallest values compared with adjacent portions of the groove. And note that the width of the side-polished area remains constant in this middle portion before tapering off to zero as the fiber drops beneath the level of the substrate surface. Also shown are additional features that may be constructed on the surfaces of the substrate and the side-polish of the fiber.
Figure 6B:
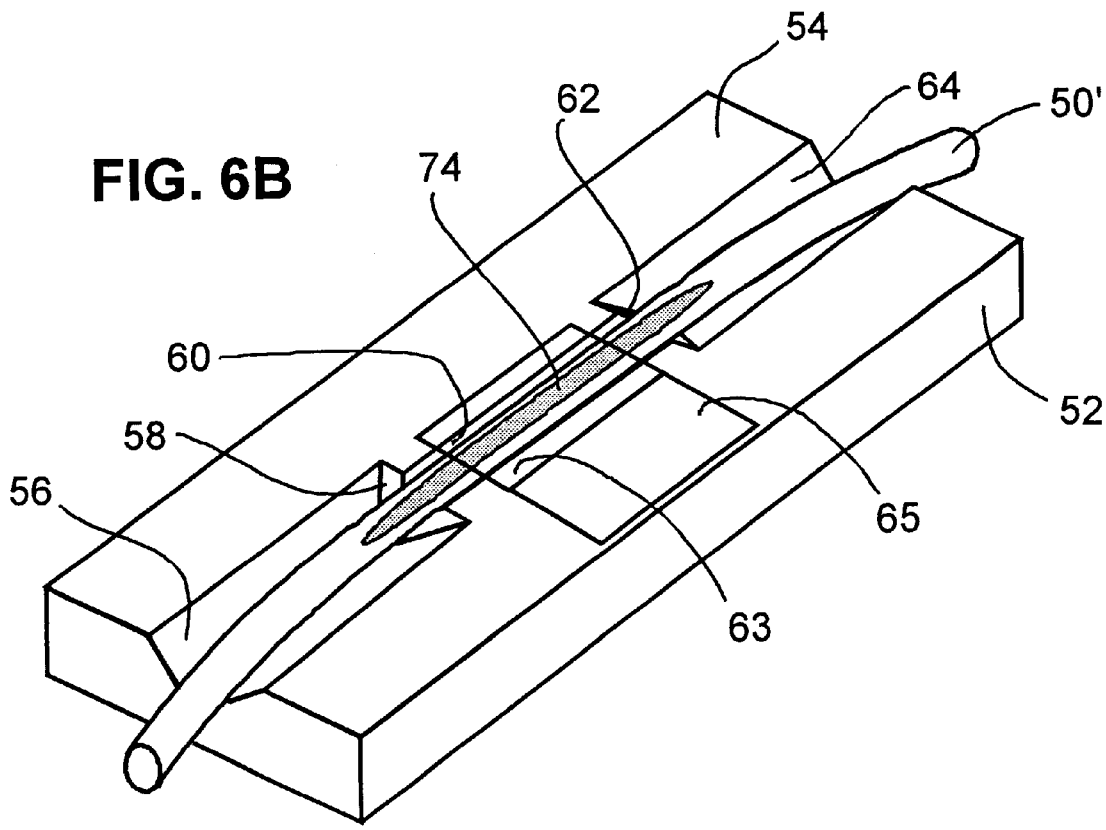

FIG. 6A and FIG. 6B show isometric views of what was shown in FIG. 5B, however now the region of side-polish 74 is more fully shown, as are other features. FIG. 6A shows a contaminating particle 76 lying within the groove portion 56 and touching both side-polished fiber 50' and one of the side-walls of the groove. The appearance of the particle is to suggest that the presence of contamination particulate and even film can displace the fiber from its intended path and trajectory. One of the advantages of the current invention is that, when the fiber is placed and aligned within the groove 50 (as seen in FIG. 5A before polishing), the fiber can be urged along its length to urge contaminating particles and film out of the middle portion of the groove, and possibly catching them on the transition surfaces of the groove. This can make the contamination objects lie within the groove portions that have larger cross-sectional dimensions where fiber alignment is less critical and where there is less chance of causing a mechanical interference.

FIG. 5B shows optional additions of various features 63 and 65 to the surfaces 54 and 74. Feature 63, for example, can be an electro-optically active film. This example of a film 63 is shown overlapping the side-polish region 74 of the fiber 50'. Element 63 could also represent an electrode. Feature 65 can represent, for example, an integrated circuit. Feature 65 could also represent one or a combination of any of the group comprising a light source, a detector, a grating, a diffractive optic, a non-linear material, a reflector, a grin lens, a spherical lens, a refractive prism, a polarizer, a filter, an isolator, a circulator, a modulator, an attenuator, a coupler, a multiplexer, a switch, and a planar optical circuit.

Figure 7:
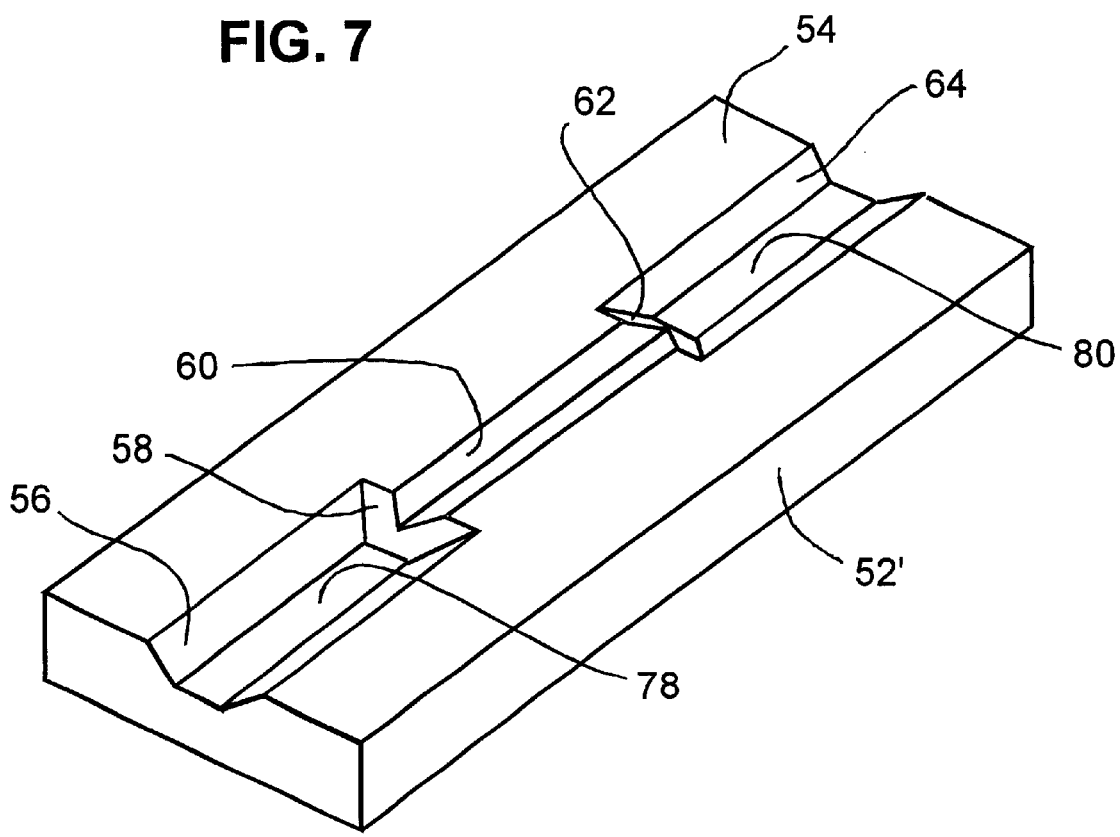
FIG. 7 shows a perspective similar to that of FIG. 6, but wherein the fiber is not shown in order to illustrate an alternative configuration to the groove. In this view, the bottoms of the groove portions that form the ends of the groove are parallel to the substrate surface.

FIG. 7 shows a variation 52' of the substrate 52 shown in FIG. 6A and FIG. 6B. Here the substrate groove portions 56 and 64 have been made with bottoms 78 and 80 that are generally parallel to the surface 56. This can be accomplished by masking for a larger cross-sectional dimension in these groove portions 56 and 64 and not etching long enough to etch to the full V-shape cross-section. This generally flat-bottomed approach allows for an even greater tolerance to the contamination discussed above.

For more information about crystal geometry, crystalplane orientations, Miller indices, and etching, reference can be made to standard text books known in the integrated circuit processing industry and in the field of crystallography. For information on prior art for orienting photolithographic masks precisely to crystal planes, see for example: "MEMS Packaging for Micro Mirror Switches", by L. S. Huang, S. S. Lee, E. Motamedi, M. C. Wu, and C. J. Kim, Proc. 48th Electronic Components & Technology Conference, Seattle, Wash., May 1998, pp. 592–597.

Figure 8A:
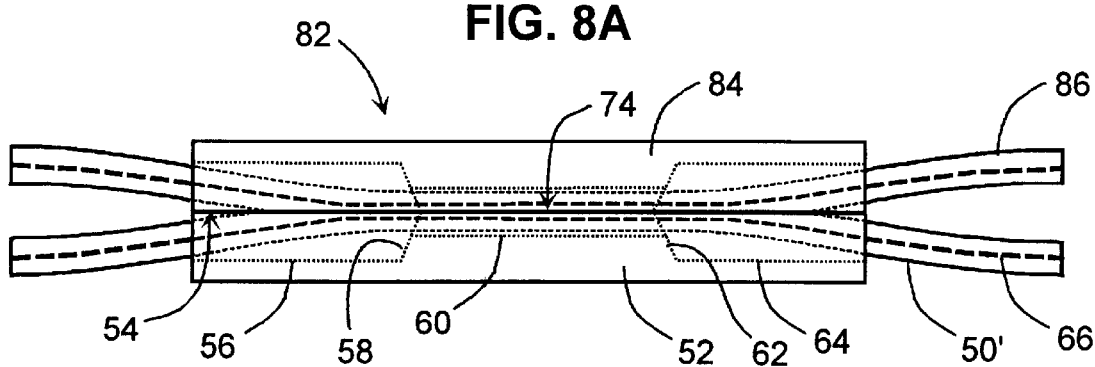
FIG. 8A is similar to FIG. 5B but shows two half-couplers joined face-to-face to form a full 4-port coupler. This illustration serves as well to represent an array with additional 4-port couplers or 2-port fibers as they would be superimposed in the background and constructed accordingly with respective fibers and grooves as that in the foreground. The interfacing planar surfaces of either or both substrates may include one or more thin films and/or integrated circuitry. The integrated circuitry may include planar optical waveguides. An additional view is presented in FIG. 8B.

FIG. 8A is similar to FIG. 5B but shows two two-port half-couplers instead of just one. The lower half-coupler is shown again as in FIG. 5B with substrate 52 and fiber 50'. The upper half-coupler is shown with substrate 84 and fiber 86. These two half-couplers are joined face-to-face at surface 54, and side-polished surfaces at region 74, to form a full 4-port coupler 82. FIG. 8A serves as well to represent an array with additional 4-port couplers hidden behind the one shown in the foreground. Array elements hidden in the background may also include just single 2-port half-couplers (without a matching 2-port half-coupler positioned opposite and face-to-face with the first. The interfacing surfaces 74 of either or both side-polished fibers may be coated with a film, wherein this film may be electro-optically active. The interfacing surfaces 54 of either or both substrates may include at least one of the group consisting of a thin film, an electro-optically active film, an integrated electrical circuit, and an integrated optical circuit. The integrated circuit may include at least one planar optical waveguide. An additional view is presented in FIG. 8B.

Figure 8B:
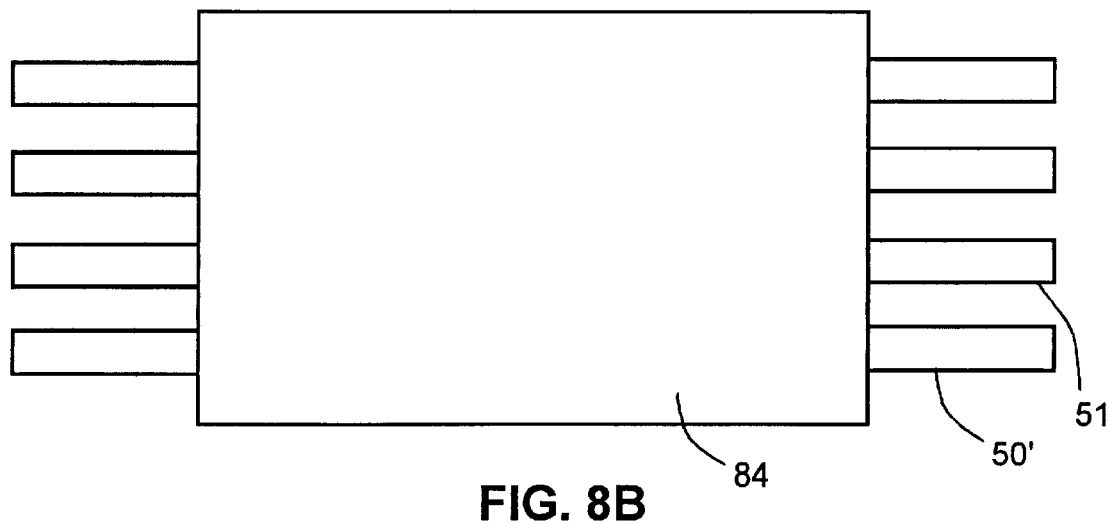
FIG. 8B shows a planer array of parallel side-polished fibers which would have a side view identical to that of FIG. 8A. The fibers shown may be 4-port couplers or 2-port single side-polished fibers. Any two 4-port full-couplers or 2-port half-couplers would not have to be designed to perform identical function. For example, some might be passive while others are active.

FIG. 8B shows a planer array of parallel side-polished fibers such as 50' and 51 partially hidden behind a substrate 84. This array could have a side view identical to that of FIG. 8A. The fibers shown may be of full 4-port couplers or of single 2-port side-polished couplers. Any two of the full 4-port couplers or 2-port half-couplers would not have to be designed to perform identical function. For example, some might be passive while others are active, or some might incorporate Bragg gratings and some not.

FIG. 9 shows a series of actions 102, 104, 106, 108, 110, 112, 114 comprising a method 100, according to the invention, for making at least one side-polished optical fiber held in a groove within the surface of a silicon substrate as described above. Action 102 is to provide a silicon substrate. Action 104 is to mask a surface of the silicon substrate for etching grooves. Action 106 is to etch at least one groove in the surface. Action 108 is to provide at least one optical fiber. Action 110 is to position at least one fiber into a groove. Action 112 is to bond each positioned fiber into its groove. Action 114 is to remove the side-regions from all of the bonded fibers.

In FIG. 9, the activity 110 of positioning one or more fibers into a respective groove can include urging each fiber along its groove to dislodge contaminating particles and film. The urging can sweep deleterious contaminating particles and films on the fiber or groove surfaces out of the shallowest portion of the groove, which is most critical, and into larger and deeper portions that are less critical. The activity 112 of bonding each positioned fiber into its respective groove can include bonding the fiber into place within first within the shallowest portion (portion with the smallest cross-sectional dimensions), and thereafter within the rest of the groove. The activity 106 of etching at least one groove in the surface of the substrate can include subsequently stripping the mask off of said silicon surface. If the mask is not stripped off of the surface of the substrate, the thickness of the mask should be included in the calculation of the groove size to achieve a desired thickness in the side-wall remaining on the fiber after side-wall removal. The activity 106 of etching can be that of an anisotropical wet-etch. The activity 102 of providing a silicon substrate can be that of providing a substrate with a surface having at least one element selected from the group consisting of an integrated electronic circuit, an integrated optical circuit, a conductive electrode, an integrated optic, an optical waveguide, a micro-mechanical device, a micro-optical device, and a thin film.

Although the invention is described with respect to preferred embodiments, modifications thereto will be apparent to those skilled in the art. Therefore, the scope of the invention is to be determined by reference to the claims that follow.

What is claimed is:

1. A side-polished fiber optic apparatus, the apparatus comprising:
    (a) an optical fiber having a first region that is side-polished,
    (b) a substrate for supporting the optical fiber,
    (c) a first surface of said substrate,
    (d) a groove formed into said first surface,
    (e) a first portion of said groove having a constant width and depth, wherein said first portion of said groove supports said optical fiber over at least a portion of said first region that is side-polished, and
    (f) a second portion of said groove having a constant width and depth that are larger in magnitude than those of the first portion;
  wherein the fiber curves away from said first portion of said groove in a direction deeper into said groove to contact at least some of said second portion of said groove.

2. The side-polished fiber optic apparatus as in claim 1; wherein the radius of curvature of the curved portion of the fiber is less than 500 cm.

3. The side-polished fiber optic apparatus as in claim 1; wherein said first portion is longer than said second portion.

4. The side-polished fiber optic apparatus of claim 1, further including at least a third portion as one additional portion of groove; wherein said third portion of groove has a width and a depth that are constant and larger in magnitude than those of the second portion; and wherein the second portion lies between the first portion and the third portion;
    (a) the side-polished fiber optic apparatus as in claim 1, further including a third portion of said groove; wherein the third portion has a constant width and depth that are larger in magnitude than those of the first portion; and
      wherein the first portion lies between the second and third portions;
      whereby the fiber lies along a path of constant depth within the first portion and lies along arcuate paths to make contact with some of the second and third portions.

5. The side-polished fiber optic apparatus as in claim 1, further including a Bragg grating formed within the fiber.

6. The side-polished fiber optic apparatus as in claim 1; further including groove sidewalls on both sides of a groove centerline; wherein:
    (a) the substrate material is silicon,
    (b) the first surface is made parallel to a 100 crystal plane,
    (c) the groove is etched into the first surface, and
    (d) the groove is directed generally parallel to 111 crystal planes causing said sidewalls in cross-section to be sloped inward toward the centerline.

7. The side-polished fiber optic apparatus as in claim 1; comprising groove sidewalls on both sides of a groove centerline; wherein:
    (a) the substrate material is silicon,
    (b) the first surface is made parallel to a 100 crystal plane,
    (c) the groove is etched into the first surface, and
    (d) the groove is directed generally parallel to 111 crystal planes causing said sidewalls in cross-section to be sloped inward toward the centerline.

8. The side-polished fiber optic apparatus as in claim 7; wherein said first portion and said second portion are V-shaped in cross-section.

9. The side-polished fiber optic apparatus as in claim 7; wherein said second portion has a planar bottom parallel to the first surface.

10. The side-polished fiber optic apparatus as in claim 7, further including a surface region that is generally parallel to a 111 crystal plane, said surface region comprising a transition between the first portion and the second portion;
    wherein the 111 crystal plane of said surface region intersects said first surface along a line directed perpendicular to the intersection lines between said first surface and the side-walls of the groove portions that have constant widths and depths.

11. The side-polished fiber optic apparatus as in claim 1, further including:
    (a) an electro-optically active material in contact with said first region that is side-polished,
    (b) electronic control circuitry on said first surface and connected to the active material;
      whereby the apparatus can be used as an active component selected from the group including a filter, a modulator, and an attenuator.

12. The side-polished fiber optic apparatus as in claim 1, further including an optical waveguide selected from the group including a second side-polished fiber optic and a planar waveguide;
   wherein said optical waveguide is optically coupled to said optical fiber by placement against said first region that is side-polished;
   whereby the apparatus can be used as a component selected from the group including a coupler, an add-drop multiplexer, a tap, a splitter, and a combiner.

13. The side-polished fiber optic apparatus as in claim 1, further including circuitry of type selected from the group including electrical and optical; wherein said circuitry is constructed on said first surface.

14. The side-polished fiber optic apparatus as in claim 1, further including at least one thin film in contact with said first region that is side-polished.

15. A method of side-polishing an optical fiber comprising:
   (a) providing a silicon substrate having a surface generally parallel to a 100 crystal plane,
   (b) providing a lithographic etching mask on said surface and patterned for producing a groove with a first portion of its length having constant width and depth, and at least a second portion of its length having constant width and depth of greater magnitude than the first portion,
   (c) etching the silicon surface through the mask,
   (d) providing an optical fiber to lay into the groove,
   (e) positioning the fiber into the groove, wherein the fiber follows a generally straight path along the first portion and curves gradually into the second portion to make contact with at least some portion of said second portion, and wherein the size of the fiber and the sizes of the groove portions are chosen to cause the fiber to protrude above the surface of the substrate along the first portion but not along the portion of said second portion that contacts the fiber,
   (f) bonding the fiber into place within said groove,
   (g) removing a side of the fiber that protrudes above the surface of the substrate.

16. The method of claim 15 of side-polishing an optical fiber, wherein said positioning the fiber into the groove comprises urging the fiber along the groove to dislodge contaminating particles and films from within the first portion;
   whereby the urging sweeps deleterious contaminating particles and films on the fiber or groove surfaces out of the groove along said first portion of its length and into regions of the groove that are not in intimate contact with the fiber.

17. The method of claim 15 of side-polishing an optical fiber, wherein said bonding the fiber into place comprises:
   (a) bonding the fiber into place within said first portion of its length first, and then
   (b) bonding the fiber into place within said second portion of its length.

18. The method of claim 15 of side-polishing an optical fiber, wherein said etching the silicon surface through the mask includes subsequently stripping the mask off of said silicon surface.

19. The method of claim 15 of side-polishing an optical fiber, wherein said etching comprises anisotropically wet-etching.

20. The method of claim 15 of side-polishing an optical fiber, wherein said providing a silicon substrate having a surface comprises providing the surface with at least one element selected from the group consisting of an integrated electronic circuit, an integrated optical circuit, a conductive electrode, an integrated optic, an optical waveguide, a micro-mechanical device, a micro-optical device, and a thin film.

* * * * *